April 28, 1959

J. F. NENZELL 2,884,099

SEALED RIVETED JOINT

Filed March 26, 1954

INVENTOR.
J. F. NENZELL
BY
S. Tierney Jr.

United States Patent Office 2,884,099
Patented Apr. 28, 1959

2,884,099

SEALED RIVETED JOINT

Joseph F. Nenzell, Los Angeles, Calif., assignor to Rohr Aircraft Corporation, Chula Vista, Calif., a corporation of California Application March 26, 1954, Serial No. 418,910

2 Claims. (Cl. 189—36)

This invention relates to a riveted joint between two members which form a wall or part of a wall of a compartment which must be leakproof such as the cabin or fuel tank of an airplane or other structure which requires hermetic sealing.

When the rivets which fasten the metal sheets composing such a compartment are driven, it is impossible to secure a leakproof joint with the metal contacted by each rivet. Also, although the joints at some rivets might be tight at the time the rivets are driven, some of the joints become loose due to the weaving and vibration of the airplane during flight.

It is a purpose of this invention to provide a resilient sealing means which is deformed when the rivet is driven and makes the joint leakproof then and due to the resiliency of the sealing material, maintains a tight seal at the joint under the repeated stresses to which the connected sheets are subjected during the movement of the airplane or other structure formed by the connected sheets.

Another object of the invention is to provide a resilient sealing ring which is designed to slip over the shank of the rivet before the latter is driven and which becomes biased against the outer sheet and the rivet.

Another object is to provide a rivet having a preformed tapered head designed for flush mounting in the outer of the sheets being joined together and which is arranged to deform the sealing ring into sealing contact with both the head and shank of the rivet and the outer sheet upon driving the rivet.

A further object is to provide a sealing means of the type described which may be used with rivets whose formed heads are driven from a position inside the structure or with those whose heads may be driven from outside the structure.

A still further object is to provide a sealing means for a hollow rivet having an internally threaded shank and a preformed tapered head and a screw in threaded engagement with the threaded shank and having a tapered head in contact with the rivet head, said screw increasing the shear strength of the fastener.

Other objects will become apparent as the description of the rivet fastener proceeds. For a better understanding of the invention reference is made to the accompanying drawings, in which.

Figure 1:
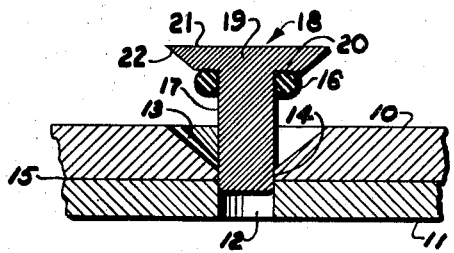
Fig. 1 is a view partly in section of a riveted joint embodying the invention showing the parts before the rivet is driven.
Figure 2:
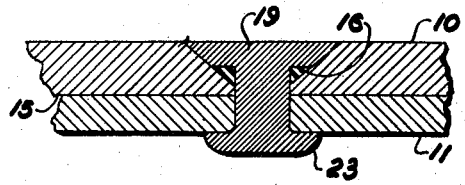
Fig. 2 is a view partly in section showing the joint of Fig. 1 after driving the rivet.
Figure 3:
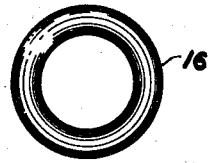
Fig. 3 is a top view of the sealing ring used.

Referring to Figs. 1 to 3, the invention is shown in connection with a riveted joint between outer and inner metal sheets 10, 11 which overlap and may form the wall of a compartment which requires hermetic sealing such as a fuel tank, the pressurized cabin of an airplane, the enclosing casing of electronic equipment or other container which must be leakproof. A cylindrical hole 12 is drilled through both sheets, then the hole in sheet 10 is counter sunk, as indicated at 13, for only a portion of its thickness leaving a short cylindrical portion 14 above the abutting faces 15 of the sheets. A toroidal ring 16, preferably of circular cross section, has an inside diameter which permits it to be easily slipped over the cylindrical shank 17 of rivet 18. Ring 16 is made of a highly resilient material such as rubber or one of the synthetic rubbers such as neoprene which springs back into its original shape after being deformed. The ring is preferably made of material which is insoluble in the liquid or other fluid to be retained in the container. The head 19 of the rivet has a circular lower face 20 of somewhat greater diameter than shank 17 so that it forms a shoulder against which ring 16 is compressed. The top face 21 is circular and the periphery 22 has the same taper as countersunk hole 13. The head 19 is preformed to the shape described at the factory where the rivet is made.

To form a sealed riveted joint, the ring 16 is slid along the shank 17 into the position shown in Fig. 1 and the shank inserted into hole 12. A tool of known type is then held against face 21 while the lower end of the shank is upset to form head 23. The formation of head 23 causes the sheets 10, 11 to be pressed together and the shank 17 to expand and fill the holes 12 and 14 so that metal-to-metal contact is secured between sheets 10—11 and both heads and the shank of the rivet resulting in a riveted joint of high shear strength. The expansion of shank 17 also takes care of the manufacturing tolerances encountered in the diameter of holes 12, 14 and of the rivet shank and also causes ring 16 to completely fill the hole under head 19. The ring is changed in shape so that its inner face becomes cylindrical and presses against the surface of shank 17, its top becomes flat and presses up against shoulder 20 and its outer surface becomes conical and presses out against the marginal wall of countersunk hole 13, as shown in Fig. 2.

Figure 4:
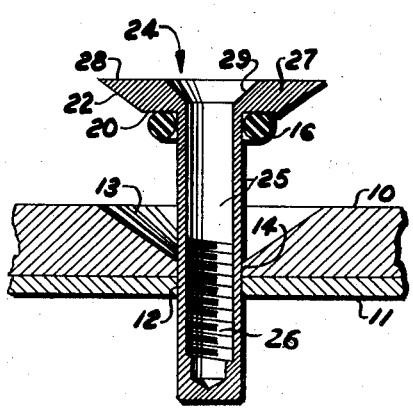
Fig. 4 is a sectional view of a riveted joint embodying a modified form of the invention showing the parts before driving the rivet.
Figure 5:
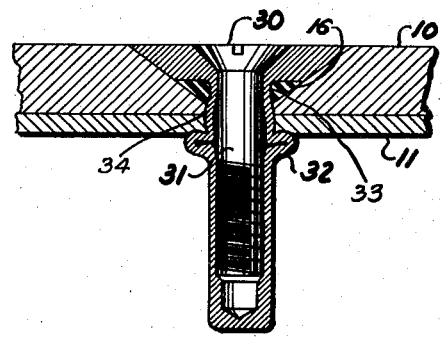
Fig. 5 is a view similar to Fig. 4 showing the parts after driving the rivet and inserting a reinforcing screw.

Figs. 4 and 5 show an alternative construction in which the holes 12, 14 and 13 in sheets 10 and 11 are similar to those above described. The rivet 24 is hollow and has a preformed hollow tapered head and a preformed hollow cylindrical deformable shank 25 the lower portion of which is interiorly threaded at 26. The head 27 has a top circular face 28, a bottom circular face 20 and a tapered periphery 22 adapted to seat against the marginal wall of hole 13. The hole in head 27 is countersunk to provide a tapered conical face 29 to receive the tapered head 30 of a screw 31 which is later screwed into thread 26. The wall of the rivet shank above the thread 26 is deformable being somewhat thinner than that at the thread. Rivets of this type may be made of certain grades of steel, aluminum alloy or brass.

In forming a sealed joint, sealing ring 16 is slipped over the shank 25 and the shank passed through hole 12. The end of a tool of known type (not shown) is then engaged in thread 26 and the shank of the rivet compressed. This causes the deformable thinner portion to bulge out and form first and second cylindrical portions 33 and 34 which are expanded radially outward into compressing engagement respectively with sealing ring 16 and with sheets 11 and 10 within holes 12 and 14 therein to entirely fill the same. Compression of the rivet shank also causes the deformable thinner shank portion to form an annular ridge portion 32 which is expanded radially outward into compressing engagement with the bottom face of lower sheet 11 in the area surrounding hole 12 therein. Ridge portion 32 presses the sheets together and deforms sealing ring 16 into sealing contact with expanded cylindrical portion 33 of the shank 25, circular face 20 and the marginal wall of hole 13, as shown in Fig. 5. The pulling tool is then removed and the screw 31 threaded into thread 26 until its head 30 presses strongly against conical seat 29. The presence of screw 31 increases the shear strength of the fastener and counteracts any tendency of the expanded cylindrical portions 33, 34 of the rivet shank between ridge portion 32 and head 27 to lengthen under the constant tension to which it would be subjected in the absence of screw 31. By suitably tightening screw 31 it will cause these radially expanded portions 33, 34 of rivet shank 25 above ridge portion 32 to be in compression and assist in maintaining a tight joint between sheets 10 and 11 and also increase in diameter somewhat the portions 33, 34 of shank 25 within the sheets 10 and 11 and thus further compress the sealing ring 16 and fill the holes 12 and 14, as aforedescribed. The presence of screw 31 also assures a smooth continuous surface on the outer face of sheet 10, a desirable feature when this surface is exposed to the airstream in flight.

While only a single rivet has been shown at each joint, it will be understood that a row of similar rivets may be used along the lap joint, each rivet being individually and effectively sealed.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. A sealed riveted joint comprising, upper and lower abutting metal sheets having aligned holes therethrough, the hole in the upper sheet having a conical surface which tapers inwardly from the top face of said upper sheet, a hollow metal rivet having a preformed hollow tapered head seated in the upper portion of said conical surface and having a preformed hollow cylindrical deformable shank extending from said head through said holes and terminating in a closed end portion remote from the bottom face of said lower sheet, said head having an upper circular face flush with the top face of said upper sheet and a lower circular face parallel thereto and extending from said shank to said conical surface, said lower circular face, the lower portion of said conical surface, and the cylindrical surface of said shank defining a toroidal space of triangular cross-section, a resilient toroidal ring filling said space and compressed therewithin from an initially circular cross-section, said shank having first and second cylindrical portions expanded radially outward into compressing engagement respectively with said ring and with said sheets within said holes, and said shank having a ridge portion expanded radially outward into compressing engagement with said bottom face of said lower sheet in the area surrounding said hole therein.

2. A sealed joint as in claim 1, said hollow rivet head having an inwardly tapered conical surface and said shank having internal threads adjacent said closed end portion, and a screw having a head seated in said conical surface of the rivet head flush with the upper circular face thereof and a tensioned threaded shank extended through said rivet shank into threaded engagement therewith.

References Cited in the file of this patent
UNITED STATES PATENTS

| | | |
|---|---|---|
| 2,396,005 | Gross et al. | Mar. 5, 1946 |
| 2,476,074 | Unger | July 12, 1949 |
| 2,531,048 | Huck | Nov. 21, 1950 |
| 2,611,285 | Gross | Sept. 23, 1952 |
| 2,751,806 | Dickie | June 26, 1956 |

FOREIGN PATENTS

| | | |
|---|---|---|
| 685,966 | Great Britain | Jan. 14, 1953 |

OTHER REFERENCES

B. F. Goodrich Rivnuts (a circular), revised August 1952.